United States Patent
Rowe et al.

[11] Patent Number: 5,939,814
[45] Date of Patent: Aug. 17, 1999

[54] CLAMPING APPARATUS FOR TURBINE GENERATOR COIL WINDINGS

[75] Inventors: Charles M. Rowe, Orlando; Alex Christodoulou, Oviedo; Thorsten Weltzien, Orlando, all of Fla.

[73] Assignee: Siemens Westinghouse Power Corporation, Orlando, Fla.

[21] Appl. No.: 09/013,174

[22] Filed: Jan. 26, 1998

[51] Int. Cl.⁶ .................................................... H02K 3/46
[52] U.S. Cl. ............................................................ 310/260
[58] Field of Search .................................. 310/260, 270, 310/271, 273

[56] References Cited

U.S. PATENT DOCUMENTS

| | | | |
|---|---|---|---|
| 3,691,416 | 9/1972 | Drexler et al. | 310/260 |
| 3,866,073 | 2/1975 | Gjaja | 310/260 |
| 3,949,257 | 4/1976 | Cooper et al. | 310/260 |
| 3,974,409 | 8/1976 | Loy | 310/260 |
| 3,988,625 | 10/1976 | Jager et al. | 310/260 |
| 3,991,334 | 11/1976 | Cooper et al. | 310/260 |
| 4,016,443 | 4/1977 | Johnson | 310/260 |
| 4,088,913 | 5/1978 | Prigorovsky et al. | 310/260 |
| 4,563,607 | 1/1986 | Cooper et al. | 310/260 |
| 4,618,795 | 10/1986 | Cooper et al. | 310/260 |
| 4,782,579 | 11/1988 | Rowe et al. | 29/596 |
| 5,373,211 | 12/1994 | Ramirez-Coronel et al. | 310/260 |

*Primary Examiner*—Nestor Ramirez
*Assistant Examiner*—Dang Dinh Le

[57] ABSTRACT

A dynamoelectric machine comprising a stator core with slots therein and top and bottom coils contained in each of the slots and extend from the end of the stator core is provided. A radial clamp for securing a pair of adjacent top coils together with a pair of bottom coils is provided. The radial clamp comprises a support block radially outside the pair of top coils. The support block has an aperture that is substantially radially lined in relation to the axis of the machine. A retaining platform is coupled proximate the bottom coils. The retaining platform defines a bore. A connecting insert member that is adapted to be adjustably mounted within the retaining platform bore is provided. The connecting insert member further defines an aperture. A traverse pin is mounted proximate the support block. A radially extending banding material having a first end and a second end which has a head portion is provided. The first end of the banding material is formed around the pin with the banding material running through the first support block aperture and with the head portion received within the connecting insert member aperture such that the connecting member can be adjusted to adjust the length of the banding material.

22 Claims, 7 Drawing Sheets

CLAMPING APPARATUS FOR TURBINE GENERATOR COIL WINDINGS

FIELD OF THE INVENTION

The present invention is related to turbine generators and more particularly to clamping apparatus for clamping stator coil windings within a turbine generator.

BACKGROUND OF THE INVENTION

Turbine generators for producing electric power are well known. Turbine generators typically comprise an end winding portion that includes a stator core that defines several slots that receive and support conductors. The end windings, however, may not be adequately supported within the core slots during operation of the generator. Thus, the end windings may be subject to severe vibrations and stresses which may cause adverse structural deformations. Structural deformation may also arise from electromagnetic forces which occur during abnormal short-circuit or fault conditions.

Figure 1:
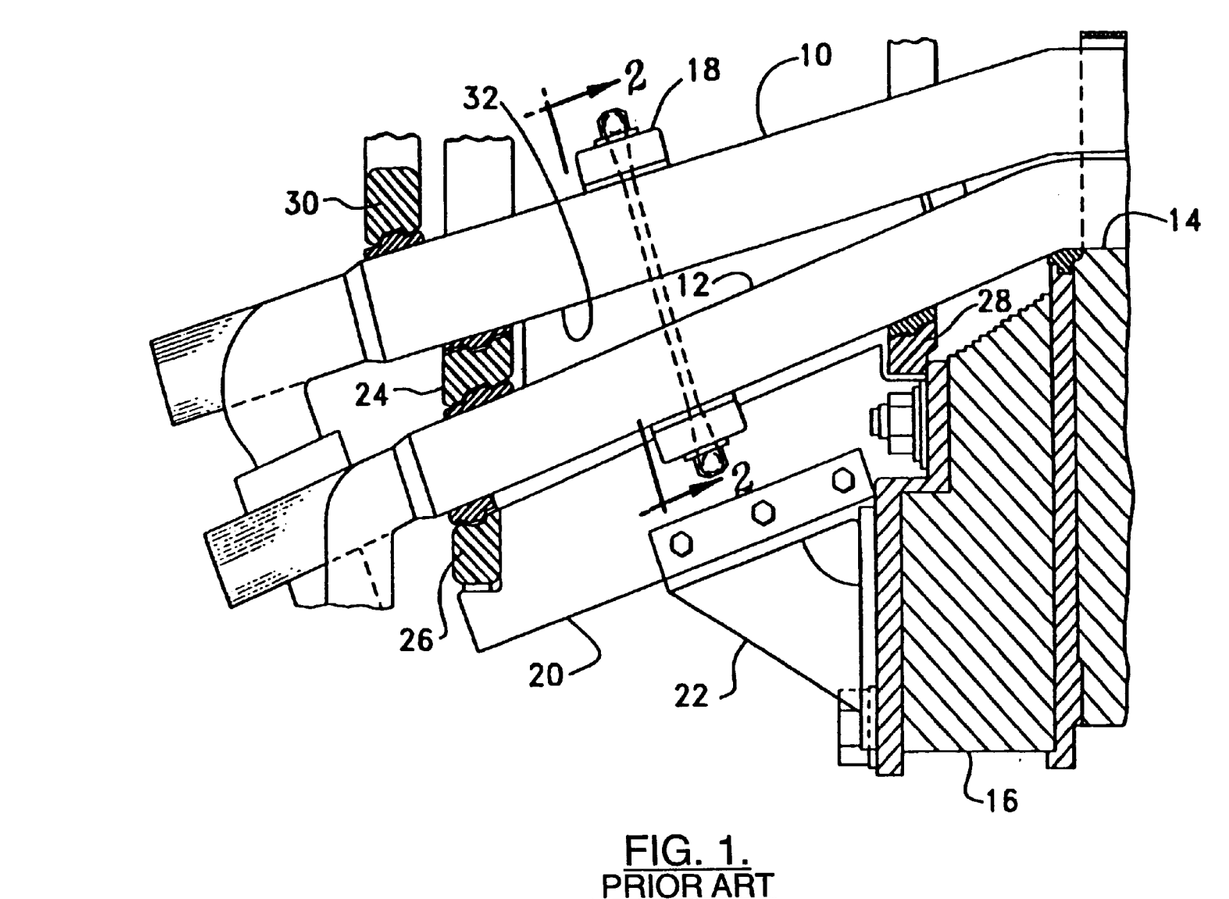
FIG. 1 illustrates a prior art radial clamp assembly that is employed in a dynamoelectric machine.

Several methods have been developed in an attempt to prevent the end windings from undergoing negative structural deformations, such as the method shown in FIG. 1 which is disclosed in U.S. Pat. No. 4,563,607 to Cooper et al. and assigned to the assignee of the present invention. A top coil 10 and bottom coil 12 are disposed within slots 14 defined by a stator iron core 16. The coils 10 and 12 are supported with a radial clamp 18, braces 20, brackets 22, rings 24, 26, 28, 30 and strain blocks 32. The radial clamp 18 is positioned in the mid-involute region between the axial extreme of the end winding and the core.

Figure 2:
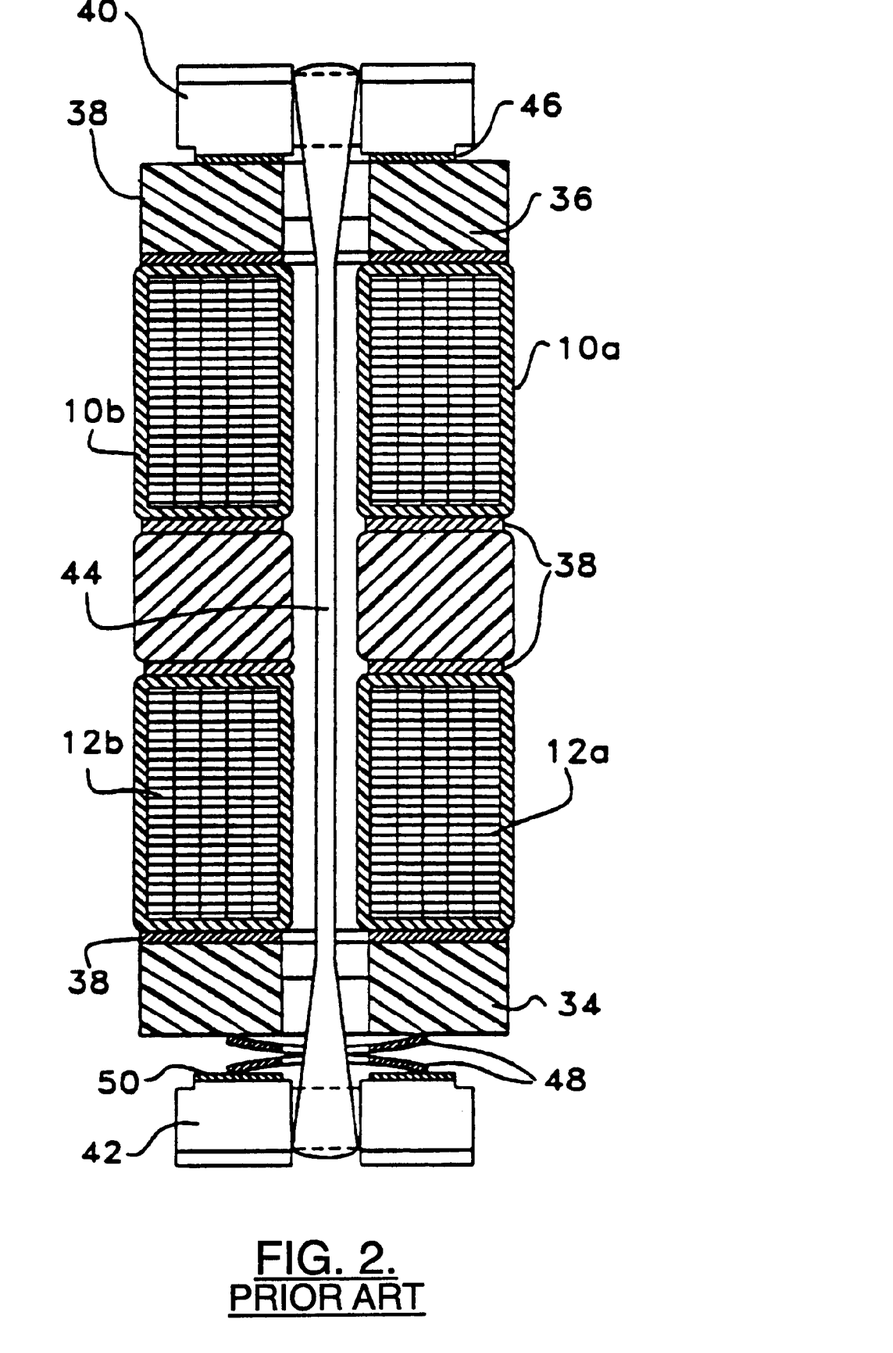
FIG. 2 is a sectional view taken along section line 2—2 of the dynamoelectric machine shown in FIG. 1.

FIG. 2 is a sectional view taken along section line 2—2 in FIG. 1. As shown, the support blocks 34 and 36 are located radially above and below a respective pair of end turns so that one support block 34 bears against two bottom coils 12a and 12b and the other support block 36 bears against two top coils 10a and 10b. Each one of the support blocks 34 and 36 is spaced from an adjacent coil by a layer 38 of conformable material.

A relative upper pin 40 is disposed across support block 36 transverse to the direction in which the coils run and a relative lower pin 42 is similarly disposed across support block 34. A tensioned banding loop 44 is disposed in a continuous loop around the pins 40 and 42 on each side of the coils so that the banding loop 44 bears against the pins which, in turn, bear against their adjacent support blocks and coils. A shim 46 is disposed between the pin 40 and the support block 36. Spring members 48 and support washers 50 are disposed between the lower pin 42 and support block 34.

The pins 40 and 42 are adapted to turn and twist the banding loop 44 to take in excess slack in the banding loop, thereby, tightening the banding loop 44 between the coils 10 and 12. The resin within the banding loop 44 is then cured, such as by hot air. After the banding loop 44 is positioned and cured, a device, such as a hydraulic jack, is used to pull at least one of the pins radially away from the coils, thereby, stretching and inducing a tension on the banding loop 44. Subsequently, the shims 46 are placed between the upper pin 40 and support block 36 so that the banding loop 44 remains in tension upon the release of the hydraulic jack.

The apparatus shown in FIGS. 1 and 2, as with other conventional apparatus, however, has several drawbacks. One such drawback is that the curing process requires additional time and expense to install, or extends schedules for band curing, and consequently adds to the overall cost of the turbine generator. It would, therefore, be desirable to provide a more economical means of installing and maintaining a turbine generator.

Another drawback is that additional time and generator components are required to adjust the banding loop. It would, therefore be desirable to reduce the number of components that must be accounted for during the installation of radial clamp bands.

SUMMARY OF THE INVENTION

A dynamoelectric machine comprising a stator core with slots therein and top and bottom coils contained in each of the slots and extending from the end of the core is provided. A radial clamp for securing a pair of adjacent top coils together with a pair of bottom coils is provided. The radial clamp comprises a support block radially outside the pair of top coils. The support block has an aperture that is substantially radially aligned in relation to the axis of the machine. A retaining platform is coupled proximate the bottom coils. The retaining platform defines a bore. A connecting insert member that is adapted to be adjustably mounted within the retaining platform bore is provided. The connecting member further defines an aperture. A transverse pin is mounted proximate the support block. A radially extending banding material having a first end and a second end which has a head portion is provided. The first end of the banding material is formed around the pin with the banding material running through the first support block aperture and with the head portion received within the connecting member aperture such that the connecting member can be adjusted to adjust the length of the banding material.

DETAILED DESCRIPTION OF THE PREFERRED EMBODIMENTS

Figure 3:
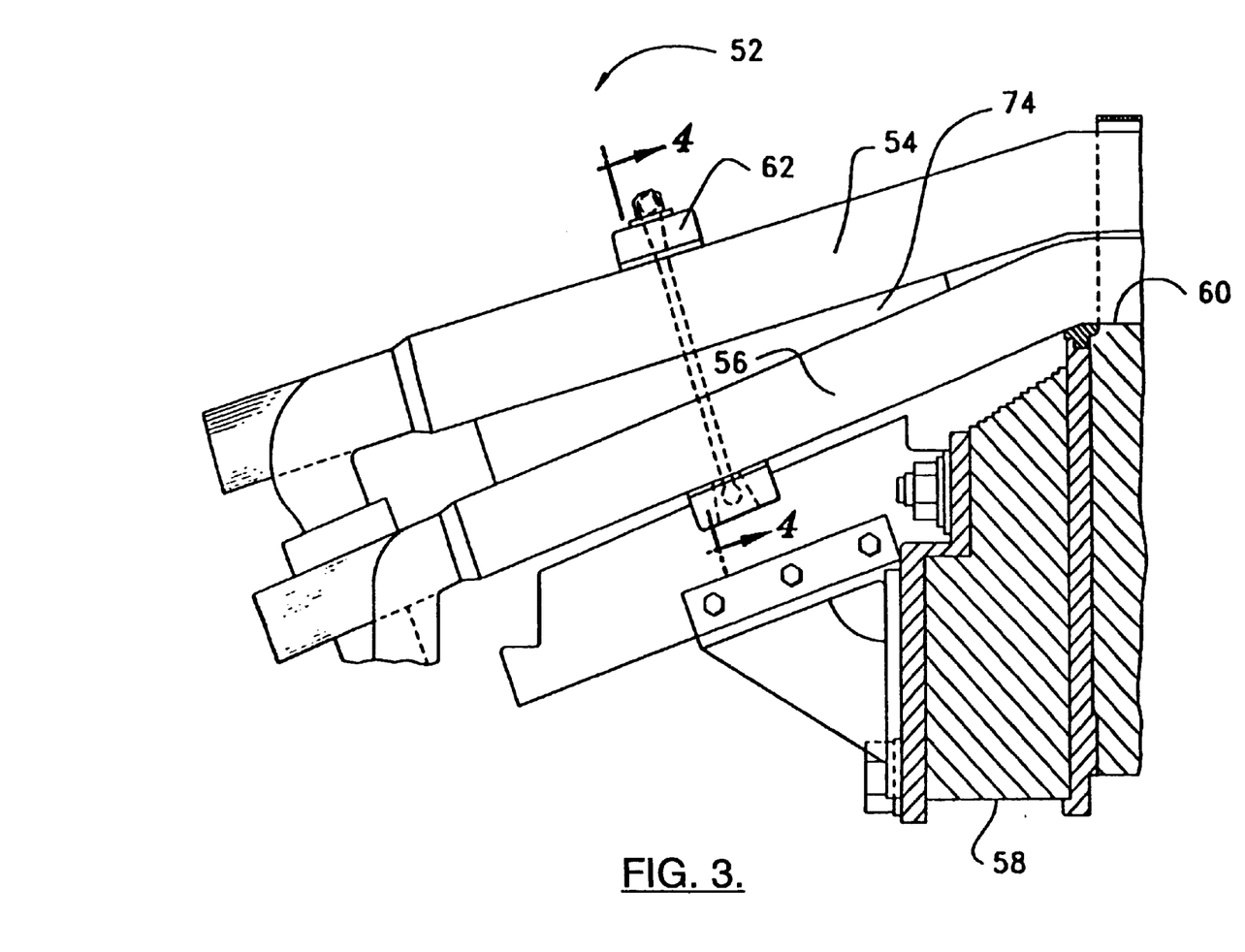
FIG. 3 illustrates a radial clamp in accordance with the preferred embodiment of the present invention that may be employed in a dynamoelectric machine.

Referring to FIG. 3 a preload system 52 for preloading a relative top or first coil end winding 54 and a relative bottom or second coil winding 56 of a stator iron core 58 is shown. The top coil 54 and bottom coil 56 are disposed within slots 60 defined by the stator iron core 58. The coils 54 and 56 are secured by a radial clamp assembly 62 in accordance with the present invention.

Figure 4:
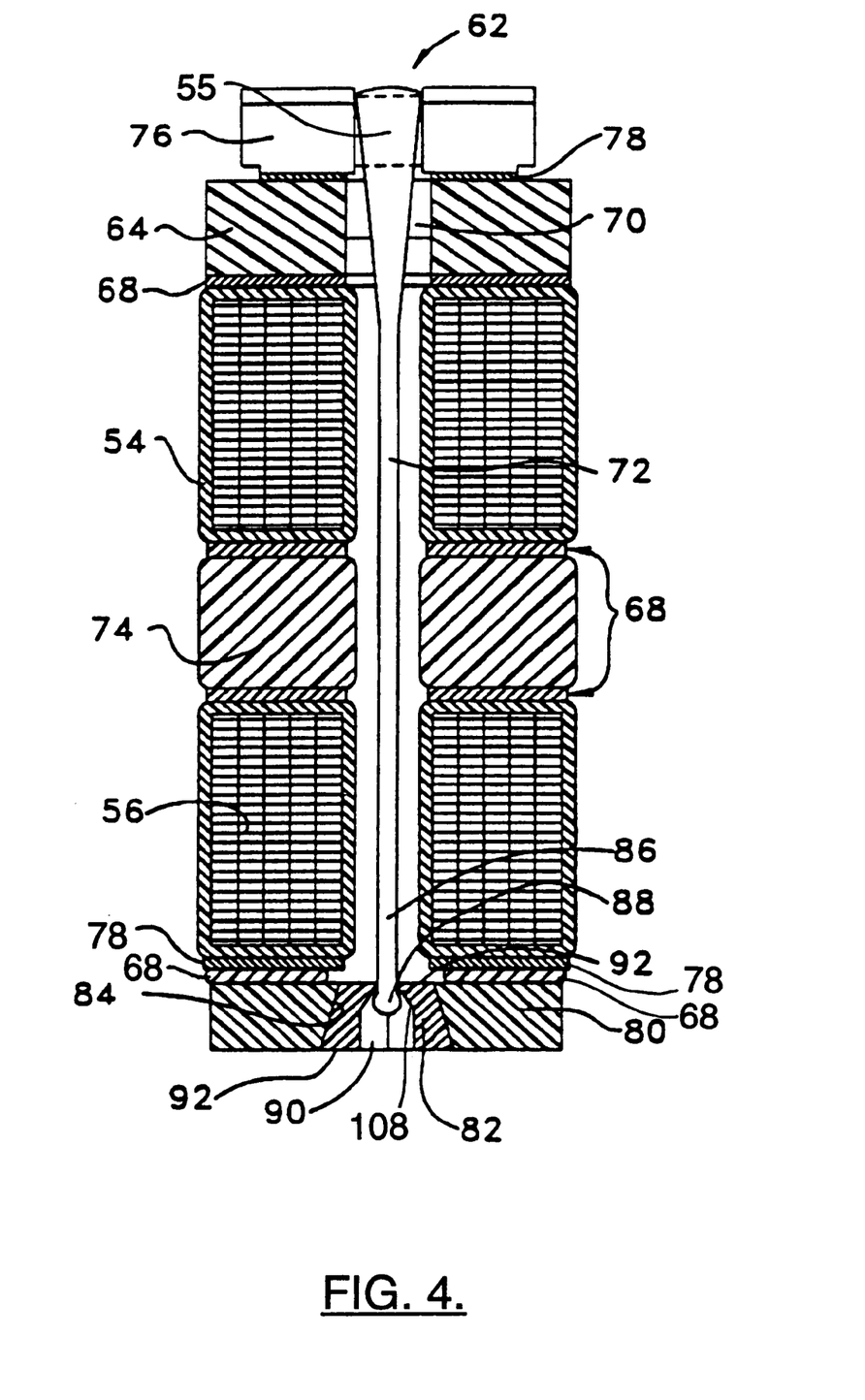
FIG. 4 is a sectional view taken along section line 4—4 of the dynamoelectric machine shown in FIG. 3.

FIG. 4 is a sectional view taken along section line 4—4 in FIG. 3 showing the radial clamp assembly 62 in more detail. The radial clamp assembly 62 includes a relative top support block 64 which is positioned radially outside a respective pair of top coils 54. Preferably, bottom support blocks are not required as the prior art discussed above. The top support block 64 is spaced from an adjacent coil by a layer 68 of conformable material, such as polyester felt. The support block compresses the top coil 54 in an operating position.

More particularly, the top support block 64 defines an aperture 70 which is adapted to receive a precured radial band 72 in accordance with the present invention therethrough to secure the coils 54 and 56 in an operating position. Preferably, the aperture 70 is substantially radially aligned in relation to the axis of the machine (a horizontal line in FIGS. 1 and 3). The support block 64 can be made of materials that are well known to those having ordinary skill in the art. The way that the radial band 72 passes through the support block aperture 70 is discussed in more detail below.

Strain blocks 74 may be positioned at various locations to provide support between the top coils 54 and bottom coils 56. The employment of strain blocks 74 is well known to those having ordinary skill in the art.

In accordance with one aspect of the present invention the radial clamp assembly 62 comprises a relative upper pin 76, the pressured radial band or banding loop 72, retaining platform 80, and connecting insert member 82 which is adapted to adjustably mate within the retaining platform. The upper pin 76 is adapted to be disposed across the top support block 64 transverse to the direction in which the top coil runs. A shim 78 may be disposed between the upper pin 76 and the top support block 64. The upper pin 76 preferably comprises a fiberglass material impregnated with an epoxy resin.

The precured radial band 72 has a first end 55 and a second end 86 which has a head portion 88 integrally coupled thereon. The first end 55 of the radial band 72 is looped, and preferably formed, around the transversely placed upper pin 76 such that the second end 86 of the banding loop can extend through the aperture 70 of the top support block 64. Preferably, the head portion 88 has a generally spherical shaped to enable the band 72 to be installed in existing windings due to the reduced size of the head portion 88.

Preferably, the precured radial band 72 is made of conventional materials, such as a fiberglass material that is impregnated with a polyester, acrylic, or epoxy resin. The radial band 72 is formed in a fixture (not shown) during a separate curing process which is performed outside of the generator. The preferred temperatures that are reached during the curing process range from 100 degrees C. to about 120 degrees C. The time that these temperatures are maintained is approximately four hours. It is noted that lower temperatures will require a longer curing time while higher temperatures will require less time to cure the band. It is noted that the radial band 72 is cured or precured with the pin 76 in place prior to being installed in the coil windings.

Figure 5:
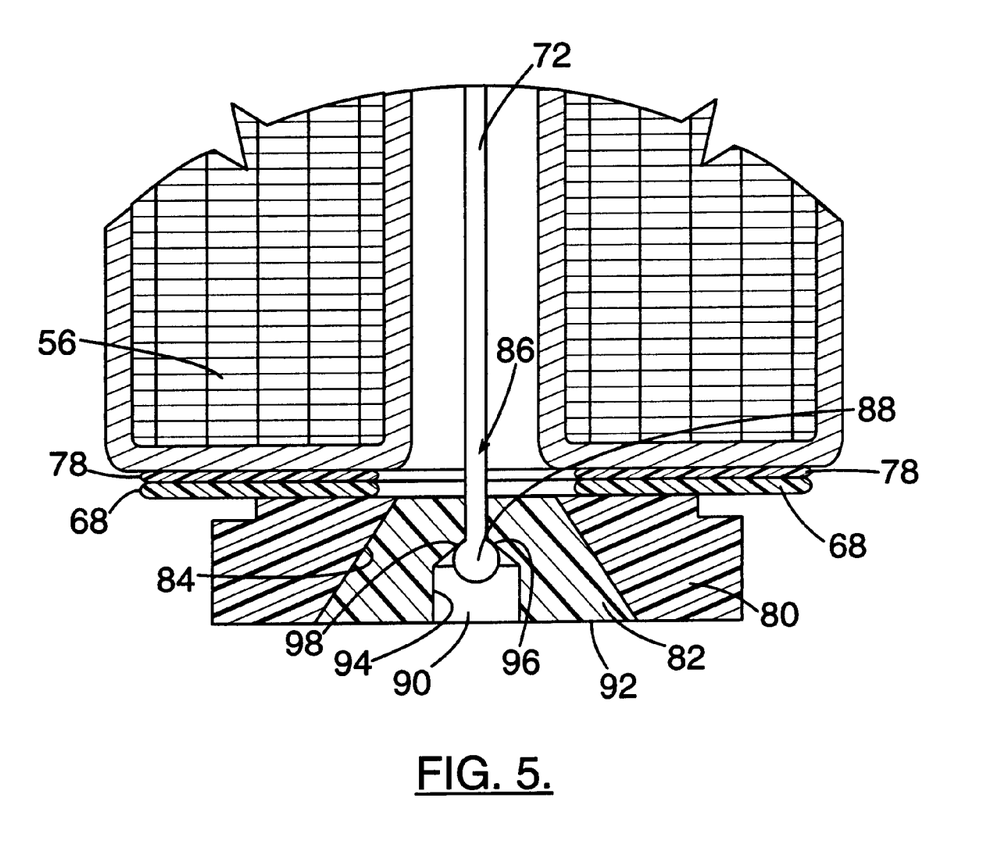
FIG. 5 is an enlarged view of a band mount assembly that is employed with the radial clamp shown in FIG. 3.

FIG. 5 illustrates the retaining platform 80 and connecting insert member 82 in more detail. The retaining platform 80 defines a bore 84 which has a substantially tapered cross-section. The bore 84 is adapted to adjustably receive the connecting insert member 82 which has a similar tapered cross-section as the bore 84. The connecting insert member 82 defines a through-hole 90 which is adapted to receive the head portion 88 therein. The retaining platform 80 is adapted to be positioned proximate the bottom coils 56.

The connecting insert member 82 is adapted to be disassembled such that the head portion 88 can be easily received within the through-hole 90. Preferably, the connecting insert member 82 has two mating halves 92 which define the through-hole 90. The through-hole 90 has a first relatively large diameter portion 94 and a second relatively small diameter portion 96. Preferably, the first and second diameter portions are coaxial. A shoulder portion 98 is positioned between the first and second diameter portions 94 and 96.

The two-halves 92 of the connecting insert member 82 are adapted to be disassembled such that the head portion 88 of the precured radial band 72 can be received in each half of the large diameter portion 94. In this arrangement, the head portion 88 of the radial band 72 is maintained within the large diameter portion 94 and against the shoulder portion 98 with the remaining portion of the banding loop 72 extending through the small diameter portion 96 towards the upper pin 76. Subsequently, the connecting insert member is placed within the bore 84 such that the connecting insert member 82 anchors the head portion 88 of the banding loop 72. Additionally, the head portion 88 is adapted to slightly rotate to adjust and align the band.

Figure 6:
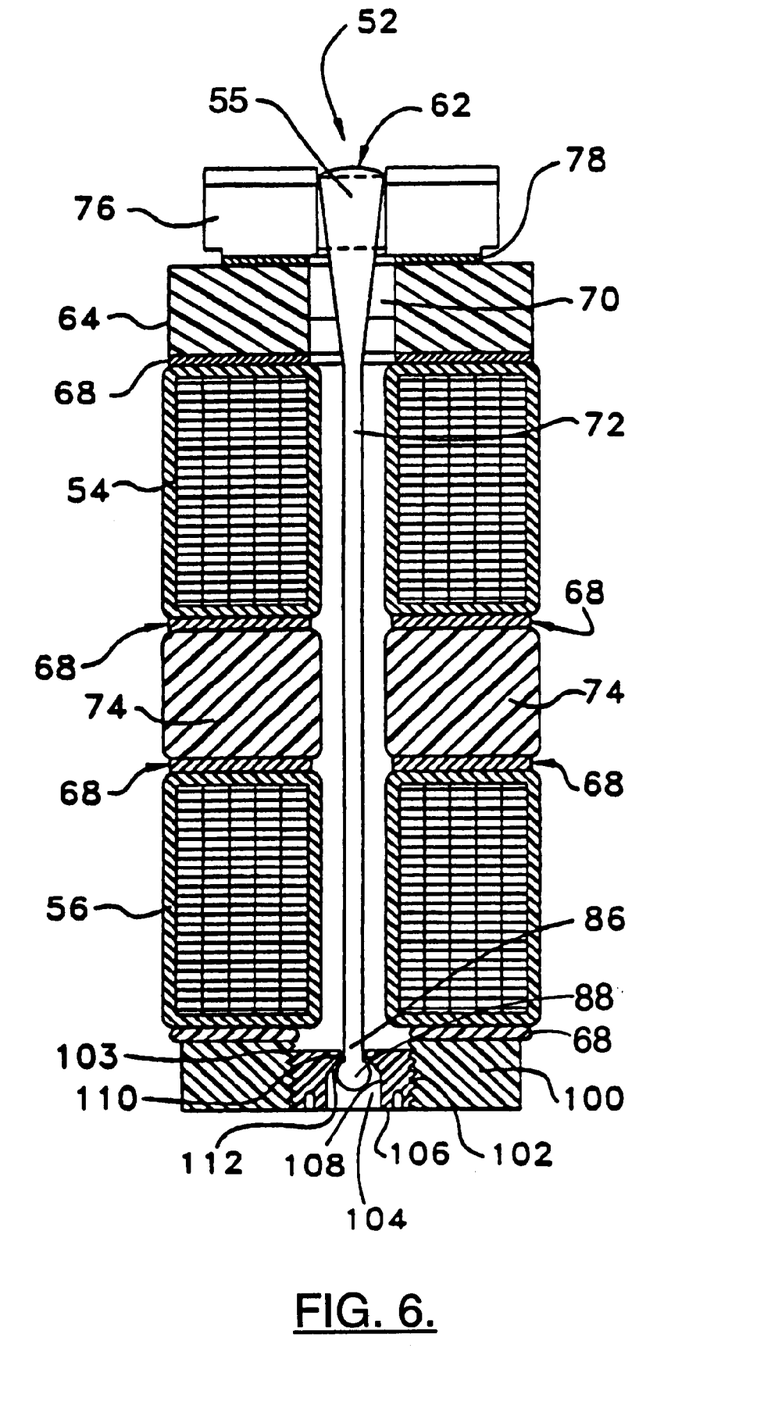
FIG. 6 illustrates a second embodiment of a radial clamp in accordance with the present invention.
Figure 7:
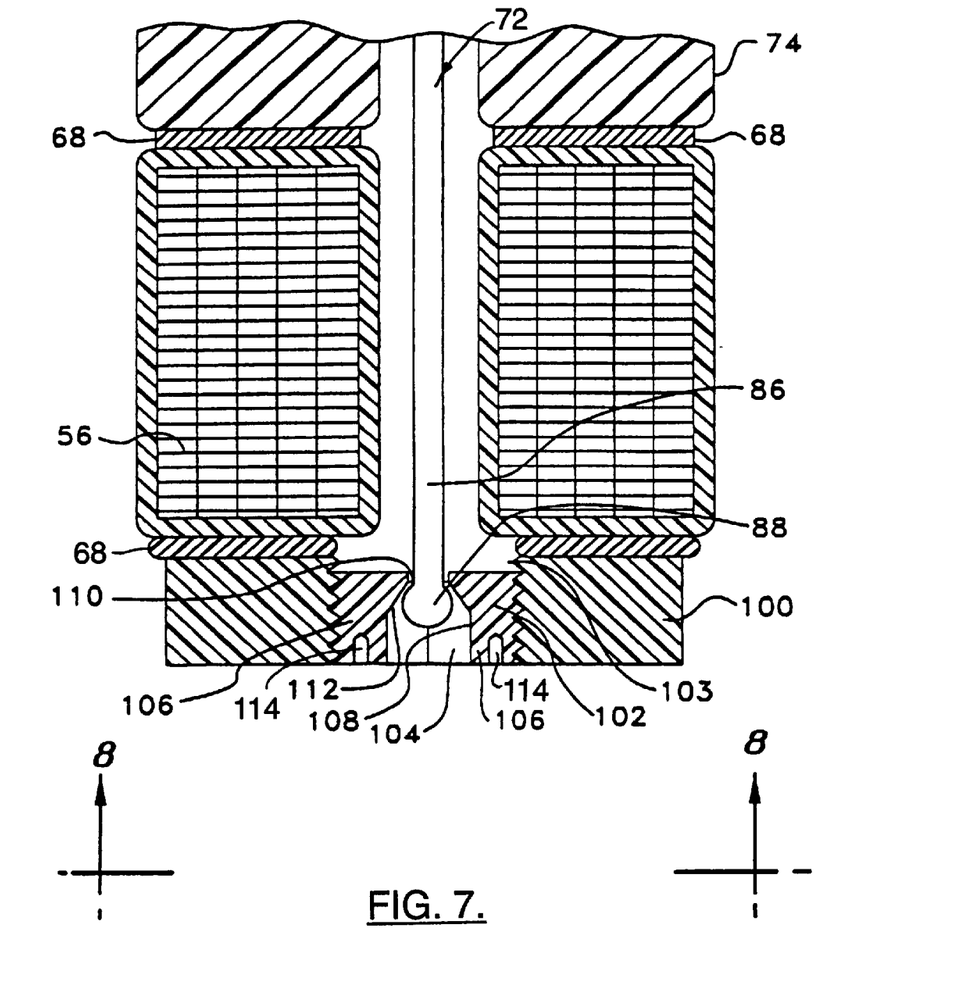
FIG. 7 is an enlarged view of a band mount assembly that is employed with the radial clamp shown in FIG. 6.
Figure 8:
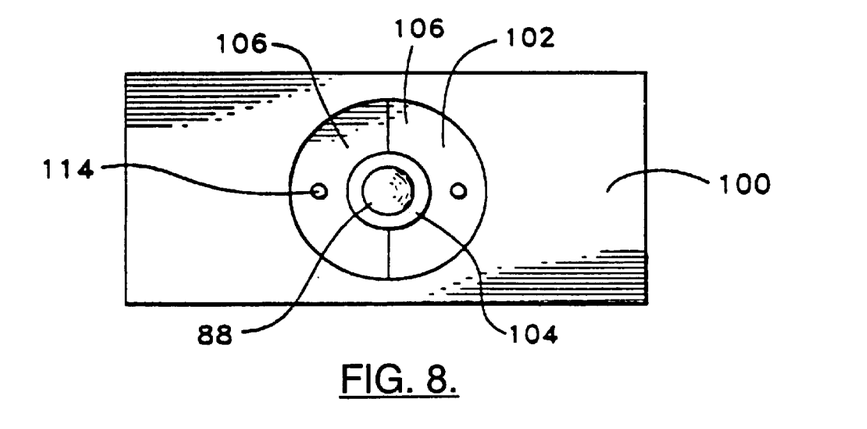
FIG. 8 is a bottom view of the band mount assembly shown in FIG. 7.

FIGS. 6 7 and 8 illustrate an alternative embodiment of a retaining platform 100 and connecting insert member 102. The retaining platform 100 defines a bore 103 which is preferably radially positioned in relation to the axis of the machine. The bore 103 is threaded to adjustably mate with the connecting insert member 102 which defines a through-hole 104.

The connecting insert member 102 is adapted for disassembly such that the head portion 88 can be received within the through-hole 104. Preferably, the connecting insert member 102 has two identical mating halves 106 which define the through-hole 104. The through-hole 104 has a first relatively large diameter portion 108 and a second relatively small diameter portion 110. Preferably, the first and second diameter portions are coaxial. A shoulder portion 112 is positioned between the first and second diameter portions 108 and 110. The connecting insert member is threaded within the retaining platform bore. Preferably, the retaining platform and connecting member are made of the same material that is employed to make the pin 76.

In this arrangement, the head portion 88 is maintained within the large diameter portion 108 and against the shoulder portion 112 with the remaining portion of the banding loop 72 extending through the small diameter portion 110 towards the pin 76. With the head portion 88 maintained, the connecting insert 102 is threaded within the retaining platform bore 103 to achieve the desired band length. In this final arrangement, the head portion 88 is adapted to slightly rotate to adjust and align the radial band. FIG. 8 shows two adjusting holes 114 which are adapted to receive an adjusting tool to adjust the length of the banding loop 72.

In operation, the precured radial band banding loop 72 is formed around the pin 76 as illustrated again with reference to FIG. 6. The pin 76 is positioned against the top support block 64 with the second end 86 of the banding loop 72 extending through the support block aperture 70. The head portion 88 of the banding loop 72 is positioned in each half 106 of the connecting insert member 102, thereby, securing the head portion 88 against the shoulder portion 112 and within the large diameter portion 108 with the remaining portion of the banding loop 72 extending through the small diameter portion 110 towards the pin 76. In this arrangement, the connecting insert member 102 is placed within the bore 103 of the platform 100 such that the connecting insert member 102 anchors the head portion 88 of the banding loop 72. Additionally, the head portion 88 is adapted to slightly rotate to adjust and align the band.

One advantage of the present invention is that the precured radial band 72 and pin assembly eliminates the curing of the banding in the winding.

Another advantage is that the head portion 88 on the radial band 72 enables a relatively quick and easy installation between the coils 54, 56.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

We claim:

1. A dynamoelectric machine comprising:
   a stator core with a plurality of slots therein, said stator core including a plurality of top and bottom coils contained within each of said plurality of slots, each of said plurality of top and bottom coils extending from an end of said stator core; and
   a radial clamp for securing a pair of top coils together with a pair of adjacent bottom coils, said radial clamp comprising:
      a support block positioned radially outside said pair of top coils, said support block having an aperture therethrough, said aperture being substantially radially aligned in relation to an axis of the dynamo electric machine to which said plurality of top and bottom coils are attached;
      a retaining platform coupled proximate said bottom coils, said retaining platform having a bore therethrough;
      a connecting insert member adapted to be adjustably mounted within said bore of the retaining platform, said connecting insert member having separable mating segments further defining a through-hole;
      a transverse pin mounted proximate said support block; and
      a radial band having a first end and a second end which has a head portion having a girth dimension greater than said radial band, said first end of said radial band looped around said transverse pin with said radial band extending through said aperture of said support block, said radial band received between said separable mating segments and with said head portion of said second end received within said through-hole of said separable mating segments and thus within said connecting insert member such that said connecting insert member can be adjusted.

2. The dynamoelectric machine in claim 1, wherein said connecting insert member is threadably received within said bore of the retaining platform and adapted to be adjusted therein.

3. The dynamoelectric machine in claim 1, wherein said bore of said retaining platform has a generally tapered cross-section, and said connecting insert member has a generally tapered cross-section that is adapted to be adjustably secured within said bore of the retaining platform such that tension of said radial band may be adjusted.

4. The dynamoelectric machine in claim 1, wherein said radial band is formed from a precured and pretensioned material.

5. A radial band formed from a banding material, said radial band useful with a radial clamp that can be employed with a dynamoelectric machine, said radial band comprising:

a first end adapted to be looped around a transverse pin; and
a spaced apart second end including a head portion having an enlarged girth dimension for being captured within an aperture, said spaced apart second end being adapted to be received within separable mating segments of a connecting insert member such that tension of the radial band can be adjusted.

6. A radial clamp that can be employed with a dynamoelectric machine, said radial clamp comprising:
   a retaining platform for coupling to coil windings, said retaining platform having a bore therethrough;
   a connecting insert member adapted to be adjustably mounted within said bore of said retaining platform, said connecting insert member formed from separable mating segments further defining a through-hole; and
   a radial band having a first end and a second end which has a head portion having an enlarged girth dimension, said first end being looped for receiving a pin therethrough and with said head portion adapted to be received between said separable mating segments and within said through-hole for securing said radial band to said connecting insert member.

7. The radial clamp in claim 6, wherein the connecting insert member is threadably received within said bore of said retaining platform and adapted to be adjusted therein.

8. The radial clamp in claim 6, wherein said bore of said retaining platform has a generally tapered cross-section, and said connecting insert member defining a generally tapered cross-section that is adapted to be adjustably secured within said bore of the retaining platform such that said radial band may be adjusted.

9. A clamping apparatus useful in clamping stator coil windings of a turbine generator, the clamping apparatus comprising:
   a support block for extending across a first pair of coil windings positioned in a spaced relation, said support block having an aperture therethrough;
   a retaining platform for extending across a second pair of coil windings positioned in a spaced relation and adjacent the first pair of coil windings, said retaining platform having a bore therethrough;
   a connecting insert member slidably carried within the bore of said retaining platform, said connecting insert member having a through-hole and admitting means for admitting a band into the through hole;
   an elongated band extending between said support block and said retaining platform for biasing the first and second pairs of coil windings therebetween, said elongated band having first and second ends, said first end having a loop for receiving a pin therethrough, said first end passing through the aperture of said support block, said elongated band passing through the through-hole of said connecting insert member with said second end having a bulbous shape for preventing passage through the through hole; and
   a pin extending transversely across the aperture of said support block and through the loop of said elongated band.

10. The apparatus in claim 9, wherein said connecting insert member comprises separable mating segments.

11. The apparatus in claim 10, wherein the separable mating segments comprise two mating half portions defining the through-hole.

12. The apparatus in claim 9, wherein the through-hole of said connecting insert member includes first and second diameters of differing dimension.

13. The apparatus in claim 9, wherein said connecting insert member is threadably received within said bore of said retaining platform.

14. The apparatus in claim 9, wherein said connecting insert member has a tapered cross-section that is adapted to be adjustably secured within said bore of said retaining platform for adjusting a tension on said elongated band.

15. The apparatus in claim 9, wherein said elongated band is formed from a precured and pretensioned material.

16. A clamping apparatus useful in clamping stator coil windings of a turbine generator, the clamping apparatus comprising:

a retaining platform for extending across a pair of coil windings positioned in a spaced relation, said retaining platform having a bore therethrough;

a connecting insert member slidably carried within the bore of said retaining platform, said connecting insert member having a through-hole and admitting means for admitting a band into the through hole; and     an elongated band passing through the through-hole of said connecting insert member, said elongated band having a bulbous shaped end dimensioned for passing through the bore of said retaining platform while preventing passage through the through-hole of said connecting insert member for having tension in said elongated band bias said platform against the coil windings.

17. The apparatus in claim 16, wherein said connecting insert member comprises separable mating segments.

18. The apparatus in claim 17, wherein the separable mating segments comprise two mating half portions defining the through-hole.

19. The apparatus in claim 16, wherein the through-hole of said connecting insert member includes first and second diameters of differing dimension.

20. The apparatus in claim 16, wherein said connecting insert member is threadably received within said bore of said retaining platform.

21. The apparatus in claim 16, wherein said connecting insert member has a tapered cross-section that is adapted to be adjustably secured within said bore of said retaining platform for adjusting a tension on said elongated band.

22. The apparatus in claim 16, wherein said elongated band is formed from a precured and pretensioned material.

* * * * *